United States Patent
Nomizo

(10) Patent No.: US 10,300,778 B2
(45) Date of Patent: May 28, 2019

(54) ENGINE UNIT SUPPORT STRUCTURE AND METHOD FOR MOUNTING ENGINE UNIT

(71) Applicant: BRIDGESTONE CORPORATION, Tokyo (JP)

(72) Inventor: Juichi Nomizo, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/744,169

(22) PCT Filed: Aug. 2, 2016

(86) PCT No.: PCT/JP2016/072684
§ 371 (c)(1),
(2) Date: Jan. 12, 2018

(87) PCT Pub. No.: WO2017/026330
PCT Pub. Date: Feb. 16, 2017

(65) Prior Publication Data
US 2018/0208039 A1    Jul. 26, 2018

(30) Foreign Application Priority Data
Aug. 7, 2015   (JP) ................................. 2015-157242

(51) Int. Cl.
*B60K 5/12*       (2006.01)
*F16M 7/00*       (2006.01)
(Continued)

(52) U.S. Cl.
CPC .............. *B60K 5/1216* (2013.01); *B60K 5/12* (2013.01); *B60W 30/20* (2013.01); *F16F 9/3207* (2013.01);
(Continued)

(58) Field of Classification Search
CPC ...... B60K 5/1216; B60K 5/12; B60K 5/1208; F16M 7/00; F16F 9/3207; F16F 15/04
See application file for complete search history.

(56) References Cited

U.S. PATENT DOCUMENTS 5,074,374 A  * 12/1991 Ohtake ................ B60K 5/1216
                                                                  180/300
2002/0166711 A1    11/2002  Witherspoon et al.
2012/0272933 A1    11/2012  Naritomi et al.

FOREIGN PATENT DOCUMENTS

EP      0890468 A2    1/1999
FR      2942998 A1    9/2010
(Continued)

OTHER PUBLICATIONS

International Search Report of PCT/JP2016/072684 dated Oct. 18, 2016 [PCT/ISA/210].
(Continued)

*Primary Examiner* — Jacob M Amick
(74) *Attorney, Agent, or Firm* — Sughrue Mion, PLLC

(57) ABSTRACT

An engine unit support structure (1) which includes an engine unit (2) having a three-cylinder engine (22), a mount (3) for mounting the engine unit, and a plurality of elastic support bodies (4) coupled to the engine unit and the mount to support the engine unit, in which the plurality of elastic support bodies (4) has a plurality of first elastic support bodies (4A) and a plurality of second elastic support bodies (4B), the second elastic support bodies (4B) are so disposed as to be orthogonal to a pitching rotation central axis (22B) of the engine unit and astride a virtual plane (22D) including a rolling rotation central axis (22A) of the engine unit, and the first elastic support bodies (4A) are disposed in a position closer to the pitching rotation central axis (22B) than the second elastic support bodies (4B) and astride the virtual plane (22D).

5 Claims, 3 Drawing Sheets

(51) Int. Cl.
*B60W 30/20* (2006.01)
*F16F 9/32* (2006.01)
*F16F 15/04* (2006.01)
*F02B 75/18* (2006.01)

(52) U.S. Cl.
CPC ............... *F16F 15/04* (2013.01); *F16M 7/00* (2013.01); *F02B 2075/1812* (2013.01)

(56) References Cited

FOREIGN PATENT DOCUMENTS

| JP | 59-196751 U | 12/1984 |
| JP | 2005-247249 A | 9/2005 |
| JP | 2006-175894 A | 7/2006 |
| WO | 2011/065426 A1 | 6/2011 |

OTHER PUBLICATIONS

Written Opinion of PCT/JP2016/072684 dated Oct. 18, 2016 [PCT/ISA/237].
Communication dated Oct. 8, 2018, from the European Patent Office in counterpart European Application No. 16835027.0.
International Preliminary Report on Patentability with the translation of the Written Opinion dated Feb. 22, 2018 issued by the International Bureau in PCT/JP2016/072684.

* cited by examiner

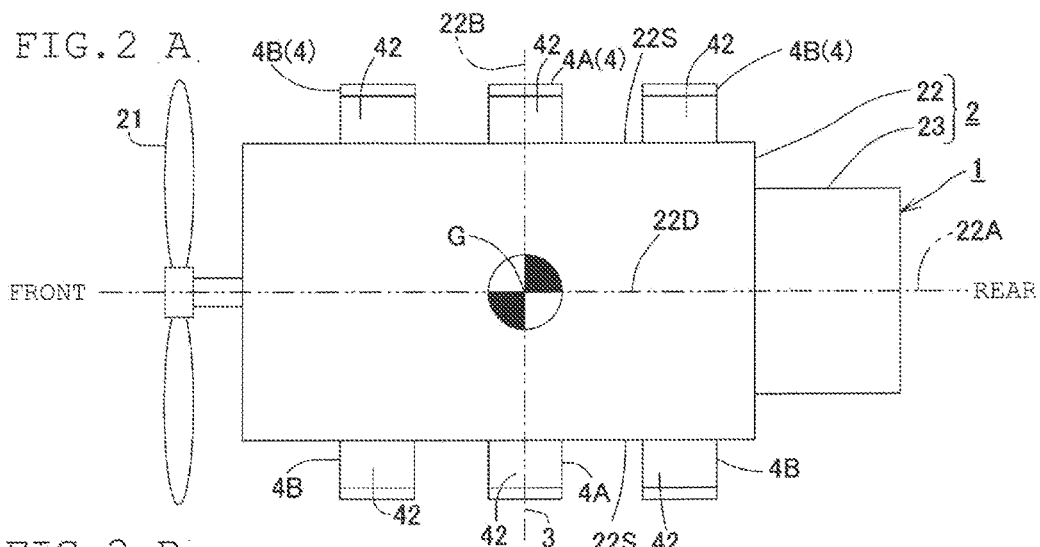
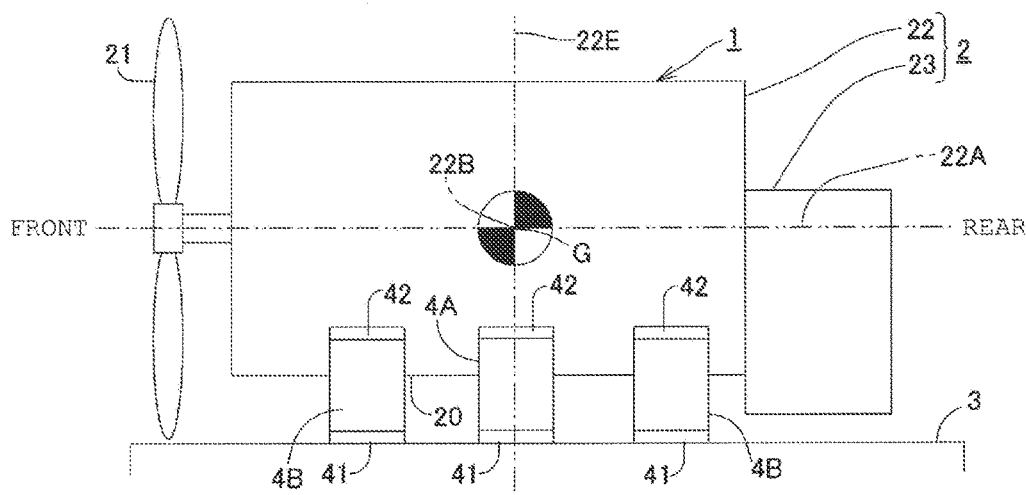
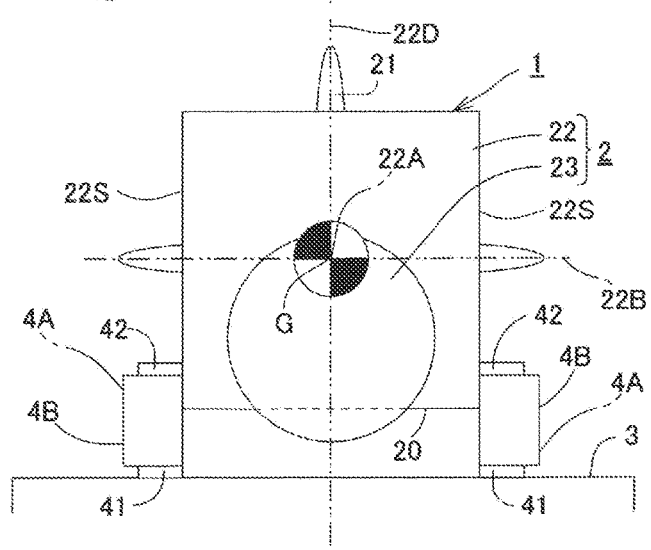

ENGINE UNIT SUPPORT STRUCTURE AND METHOD FOR MOUNTING ENGINE UNIT

CROSS REFERENCE TO RELATED APPLICATIONS

This application is a National Stage of International Application No. PCT/JP2016/072684, filed Aug. 2, 2016, claiming priority based on Japanese Patent Application No. 2015-157242, filed Aug. 7, 2015, the contents of all of which are incorporated herein by reference in their entirety.

BACKGROUND OF THE INVENTION

1. Field of the Invention

The present invention relates to an engine unit support structure with an engine unit mounted on a mount via elastic support bodies.

2. Description of the Related Art

An engine unit support structure for supporting an engine unit using elastic support bodies (elastic members) has been known as an art employed when mounting the engine unit on a mount (see Patent Document 1, for instance).

RELATED ART DOCUMENT

Patent Document

Patent Document 1: Japanese Unexamined Patent Application Publication No. 2005-247249

SUMMARY OF THE INVENTION

Problem to be Solved by the Invention

For example, three-cylinder engines are mainly used for small construction machinery, such as compact excavators.

Vibrations that occur during operation of a three-cylinder engine is a pitching vibration of first-order engine rotation (=same frequency as a engine rotation frequency) and a rolling vibration of 1.5th-order engine rotation (=same frequency as 1.5 times the engine rotation frequency). However, with the above-described engine unit support structure, there is still room for improvement in vibration absorption performance because a vibration absorption effect on the first-order pitching vibration with low frequency is not sufficient.

Accordingly, the present invention provides an engine unit support structure and the like, featuring excellent vibration absorption performance for the pitching vibration, for an engine unit having a three-cylinder engine.

Means for Solving the Problem

An engine unit support structure according to an embodiment of the present invention includes an engine unit having a three-cylinder engine, a mount for mounting the engine unit, and a plurality of elastic support bodies coupled to the engine unit and the mount to support the engine unit. For this engine unit support structure, the plurality of elastic support bodies include a plurality of first elastic support bodies and a plurality of second elastic support bodies. And the second elastic support bodies are so disposed as to be orthogonal to a rolling rotation central axis of the engine unit and astride a virtual plane including a pitching rotation central axis of the engine unit, and the first elastic support bodies are disposed in a position closer to the pitching rotation central axis than the second elastic support bodies and astride the virtual plane. Also, a method for mounting an engine unit to constitute an engine unit support structure according to an embodiment of the invention includes providing first elastic support bodies and second elastic support bodies in such positions that a load of the engine unit is borne first by the first elastic support bodies then by the second elastic support bodies when coupling the engine unit to the first elastic support bodies and the second elastic support bodies coupled to a mount from above the first elastic support bodies and the second elastic support bodies; and then coupling the engine unit and the first elastic support bodies together and coupling the engine unit and the second elastic support bodies together such that the load of the engine unit is borne by the first elastic support bodies and the second elastic support bodied in a distributed manner.

BRIEF DESCRIPTION OF THE DRAWINGS

FIG. 1A is a plan view, FIG. 1B is a front view (as seen from a side of the engine unit), and FIG. 1C is a right side view (as seen from back of the engine unit).

FIG. 2 shows the engine unit support structure. FIG. 2A is a plan view, FIG. 2B is a front view (as seen from a side of the engine unit), and FIG. 2C is a right side view (as seen from back of the engine unit).

Hereinafter, the invention will be described based on preferred embodiments which do not intend to limit the scope of the claims of the present invention. Not all of the combinations of the features described in the embodiments are necessarily essential to the solutions presented by the invention.

MODE FOR CARRYING OUT THE INVENTION

First Embodiment

Figure 1:
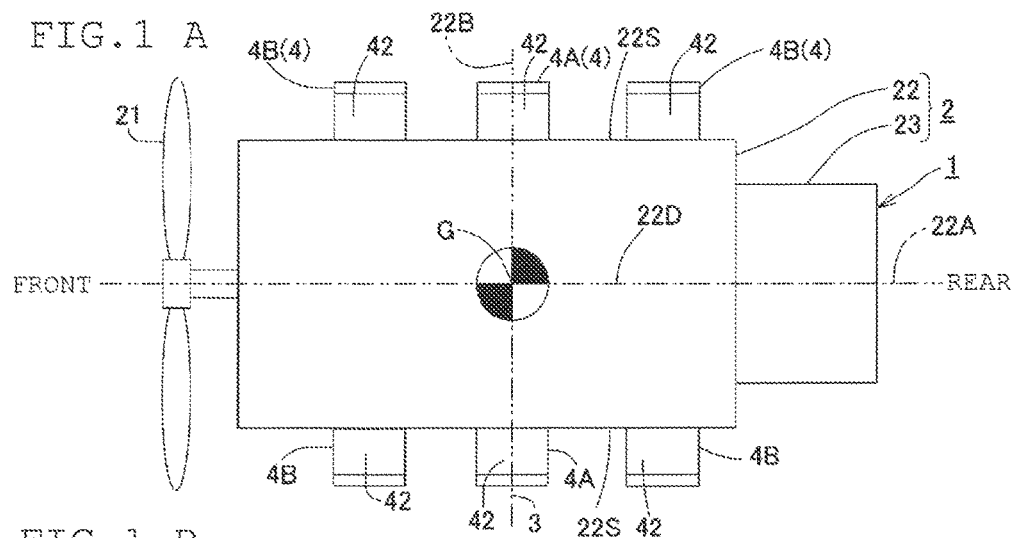
FIG. 1 shows an engine unit support structure.
Figure 1:
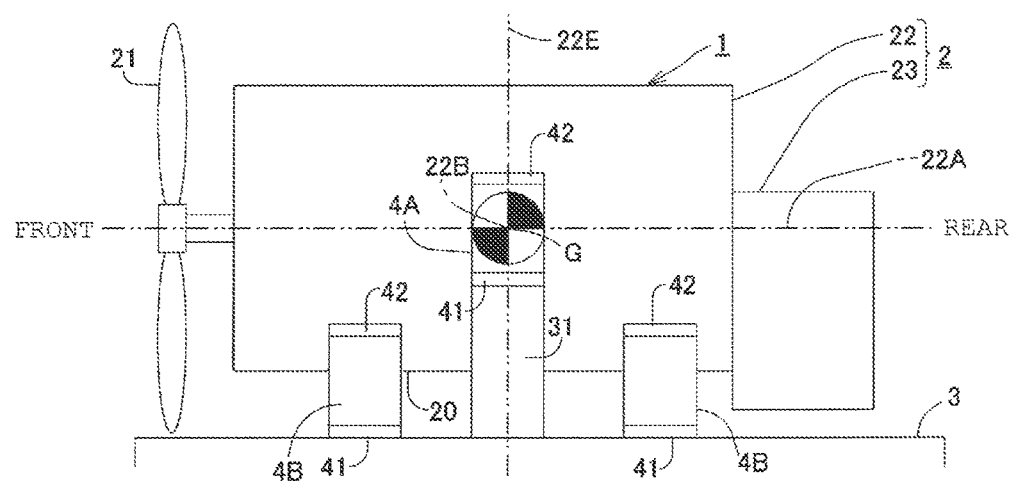
Figure 1:
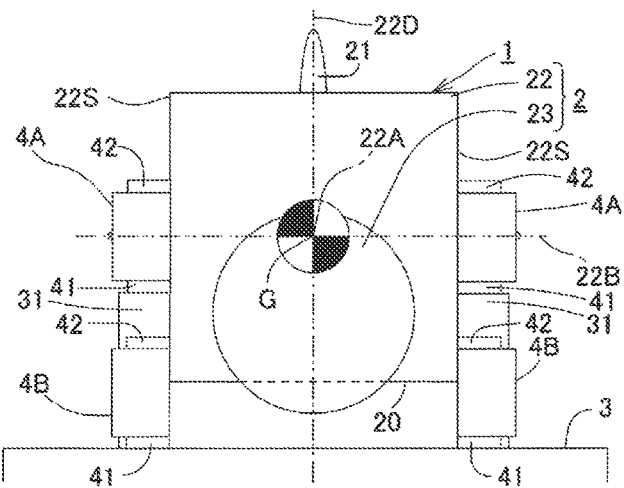

As shown in FIG. 1 and FIG. 2, an engine unit support structure 1 according to the first embodiment includes an engine unit 2, a mount 3, and a plurality of elastic support bodies 4.

For example, with an operating machine such as a construction machinery whose actuator is driven hydraulically, the engine unit 2, as shown in FIG. 1, is of a construction having a three-cylinder engine 22 which has a cooling fan 21 for cooling the engine and a hydraulic pump 23 driven by the engine 22. And the mount 3 is a vehicle frame constituting a mechanical floor of the operating machine, or a mount attached to the vehicle frame.

The engine unit 2 is equipped with a cooling fan 21 on one end side of the engine 22 (on one end side in the extension direction of a not-shown output shaft (crank shaft) of the engine 22) and the hydraulic pump 23 on the other end side of the engine 22, as shown in FIG. 1 and FIG. 2, for instance.

It is to be noted that the description of the present embodiment will be given with one end side of the engine 22 as the "front" side and the other end side of the engine 22 as the "rear" side.

The elastic support bodies 4 may be elastic support bodies having columnar rubber members as columnar elastic bodies, for instance.

As shown in FIG. 1 and FIG. 2, the elastic support bodies 4, at a lower end as one end thereof, are each coupled to the mount 3 as a vibration receiver via a joint member 41, such as a bracket, provided on the mount 3. At the same time, the elastic support bodies 4, at an upper end as the other end thereof, are each coupled to the engine unit 2 as a vibration generator via a joint member 42, such as a bracket, provided on left and right sides 22S, 22S of the engine unit 2.

The plurality of elastic support bodies 4, 4, . . . include a pair of first elastic support bodies 4A, 4A disposed orthogonal to a pitching rotation central axis 22B of the engine unit 2 and astride a virtual plane 22D (see FIG. 1A, FIG. 1C, FIG. 2A, FIG. 2C) including a rolling rotation central axis 22A of the engine unit 2 and two pairs of second elastic support bodies 4B, 4B, 4B, 4B, disposed astride the virtual plane 22D.

The rolling rotation central axis 22A of the engine unit 2 is an axis extending in a front-rear direction of the engine unit 2 which is a center of rotation when the engine unit 2 rotates and vibrates.

The pitching rotation central axis 22B of the engine unit 2 is the axis extending in a left-right direction of the engine unit 2 which is a center of rotation when the engine unit 2 rotates and vibrates.

It is to be noted that FIG. 1 and FIG. 2 illustrate the rolling rotation central axis 22A passing through a gravity center G of the engine unit 2 and the pitching rotation central axis 22B passing through the gravity center G of the engine unit 2. However, there are cases where the rolling rotation central axis 22A and the pitching rotation central axis 22B do not pass through the gravity center G of the engine unit 2.

As shown in FIG. 1 and FIG. 2, a pair of first elastic support bodies 4A, 4A is so located as to be along the left and right sides 22S, 22S of the engine unit 2. At the same time, each of the pair of first elastic support bodies 4A, 4A is disposed near the pitching rotation central axis 22B of the engine unit 2, and more preferably orthogonal to the rolling rotation central axis 22A of the engine unit 2 and on a virtual plane 22E (see FIG. 1B and FIG. 2B) including the pitching rotation central axis 22B of the engine unit 2.

It is further preferable that the first elastic support bodies 4A are disposed on the axis line of the pitching rotation central axis 22B. The first elastic support bodies 4A being disposed on the axis line of the pitching rotation central axis 22B means that the first elastic support bodies 4A are located in positions where the pitching rotation central axis 22B of the engine unit 2 passes. More preferably, the first elastic support bodies 4A are disposed such that the pitching rotation central axis 22B of the engine unit 2 passes through the gravity center of the first elastic support bodies 4A. This will improve the vibration absorption performance for the pitching vibration of low frequency peculiar to the three-cylinder engine 22.

In this case, a mount 31 having a mounting surface higher than a mounting surface of the mount 3 is to be provided. And the first elastic support bodies 4A are to be mounted on the mounting surface of the mount 31.

It is to be noted that, as shown in FIG. 2, the first elastic support bodies 4A may be disposed on the virtual plane 22E below the pitching rotation central axis 22B. In such a case, it is preferable that the gravity center of the first elastic support bodies 4A is located directly underneath the pitching rotation central axis 22B.

Also, although not shown, the first elastic support bodies 4A may be disposed on the virtual plane 22E above the pitching rotation central axis 22B. In such a case, it is preferable that the gravity center of the first elastic support bodies 4A is located directly above the pitching rotation central axis 22B.

Also, the pair of first elastic support bodies 4A, 4A is disposed in positions an equal distance from the rolling rotation central axis 22A of the engine unit 2

As shown in FIG. 1 and FIG. 2, two pairs of second elastic support bodies 4B, 4B, 4B, 4B are so located as to be along the left and right sides 22S, 22S of the engine unit 2. At the same time, they are disposed in positions farther from the pitching rotation central axis 22B of the engine unit 2 than the first elastic support bodies 4A.

One pair of second elastic support bodies 4B, 4B is disposed in positions an equal distance from the rolling rotation central axis 22A of the engine unit 2.

Similarly, the other pair of second elastic support bodies 4B, 4B is disposed in positions an equal distance from the rolling rotation central axis 22A of the engine unit 2.

In other words, the engine unit support structure 1 according to the first embodiment is installed such that the second elastic support bodies 4B are located astride the virtual plane 22D. Also, the first elastic support bodies 4A are closer to the pitching rotation central axis 22B than the second elastic support bodies 4B and astride the virtual plane 22D.

With the engine unit support structure 1 according to the first embodiment, a pair of first elastic support bodies 4A, 4A is so arranged as to be along the left and right sides 22S, 22S of the engine unit 2. At the same time, the pair of first elastic support bodies 4A, 4A is disposed near the pitching rotation central axis 22B of the engine unit 2, and more preferably orthogonal to the rolling rotation central axis 22A of the engine unit 2 and on a virtual plane 22E including the pitching rotation central axis 22B of the engine unit 2. Further, two pairs of second elastic support bodies 4B, 4B, 4B, 4B are so arranged as to be along the left and right sides 22S, 22S of the engine unit 2, and they are disposed in positions farther from the pitching rotation central axis 22B of the engine unit 2 than the first elastic support bodies 4A. Hence, the provision of the pair of first elastic support bodies 4A, 4A will reduce the distributed load of the engine unit 2 to be borne by each of the four second elastic support bodies 4B, 4B, 4B, 4B. And this can make a spring constant of the second elastic support body 4B smaller. As a result, the engine unit support structure can excel in the vibration absorption performance for controlling the pitching vibration of low frequency peculiar to the three-cylinder engine 22.

In other words, a pair of first elastic support bodies 4A, 4A is disposed near the pitching rotation central axis 22B of the engine unit 2, and more preferably orthogonal to the rolling rotation central axis 22A of the engine unit 2 and on the virtual plane 22E including the pitching rotation central axis 22B of the engine unit 2. Thus, the spring constant of the second elastic support body 4B can be made smaller. Also, the influence of the pair of first elastic support bodies 4A, 4A on the pitching vibration of low frequency peculiar to the three-cylinder engine 22 can be made smaller. As a result, the engine unit support structure 1 featuring superior vibration absorption performance for controlling the vibration of the engine unit 2 having a three-cylinder engine 22 can be provided.

A frequency of the pitching vibration occurring when the speed of the three-cylinder engine is 1200 rpm, for instance, is 20 Hz. With the engine unit support structure as disclosed in the above-described Patent Document 1, it is difficult to control the pitching vibration of frequencies as low as 20 Hz. However, with the engine unit support structure 1 of the present embodiment, the pitching vibration of frequencies as low as 20 Hz can be controlled.

Also, if the pair of first elastic support bodies 4A, 4A is installed on the under surface 20 of the engine unit 2, it is possible that the pair of first elastic support bodies 4A, 4A is located significantly downward apart from the gravity center G of the engine unit 2. According to the first embodiment, the pair of first elastic support bodies 4A, 4A is not installed on the under surface 20 of the engine unit 2, but along the left and right sides 22S, 22S of the engine unit 2. Therefore, it becomes possible to locate the pair of first elastic support bodies 4A, 4A close to the pitching rotation central axis 22B of the engine unit 2, which improves the vibration absorption performance for the pitching vibration.

Also, it becomes possible to use rubber of smaller spring constant as the second elastic support bodies 4B. This will improve the vibration absorption performance. At the same time, the durability of the engine unit support structure 1 can be improved because the load of the engine unit 2 is borne by two first elastic support bodies 4A and four second elastic support bodies 4B, 4B, 4B, 4B. That is, the engine unit support structure 1 thus obtained excels in both vibration absorption performance and durability.

Also, the vibration absorption performance of the engine unit support structure 1 can be further improved by using elastic support bodies equipped with columnar rubber members as the plurality of elastic support bodies 4, 4, . . . .

Second Embodiment

Pre-compressed first elastic support bodies 4A or first elastic support bodies 4A formed with harder rubber than the second elastic support bodies 4B may be used so that the distributed load of the engine unit 2 borne by each of the first elastic support bodies 4A is greater than the distributed load of the engine unit 2 borne individually by the second elastic support bodies 4B, 4B, 4B, 4B. By so arranging, the distributed load of the engine unit 2 borne individually by the second elastic support bodies 4B, 4B, 4B, 4B will be lightened. Accordingly, it becomes possible to use rubber of even smaller spring constant than that of the first embodiment as the second elastic support bodies 4B. This will further improve the vibration absorption performance of the engine unit support structure 1 described in the first embodiment. At the same time, the durability of the engine unit support structure 1 can be further improved because the load of the engine unit 2 is borne by the first elastic support bodies 4A and four second elastic support bodies 4B, 4B, . . . .

Third Embodiment

The arrangement may be such that the first elastic support bodies 4A whose vertical (direction in which the engine unit 2 is supported) spring constant is greater than the vertical spring constant of the second elastic support body 4B is used so that the distributed load of the engine unit 2 borne by the first elastic support body 4A is greater than the distributed load of the engine unit 2 borne individually by the second elastic support bodies 4B, 4B, . . . . This may realize an arrangement such that the distributed load of the engine unit 2 borne by the first elastic support body 4A is greater than the distributed load of the engine unit 2 borne individually by the second elastic support bodies 4B, 4B, . . . . And the effect as described in the second embodiment can be obtained.

For example, this may be realized by use of a columnar rubber body constituting the first elastic support body 4A whose vertical spring constant is greater than the vertical spring constant of the columnar rubber body constituting the second elastic support body 4B.

Fourth Embodiment

Also, the first elastic support body 4A to be used may be one whose vertical (direction in which the engine unit 2 is supported) spring constant is greater than the spring constant in the direction intersecting with the vertical direction, that is, one whose vertical spring is hard and horizontal spring is soft with the stiffness ratio being 0.4 or below, for instance. This will further improve the vibration absorption performance of the engine unit support structure 1.

For example, a columnar rubber body constituting the first elastic support body 4A whose stiffness ratio is 0.4 or below may be used.

That is, use of a vibration absorbing rubber which is hard in the vertical direction and soft in the horizontal direction as the first elastic support bodies 4A, 4A may further improve the vibration absorption performance for the pitching vibration.

Fifth Embodiment

Now a description is given of a method for mounting an engine unit to constitute the engine unit support structure described in the foregoing first to fourth embodiments.

Figure 3:
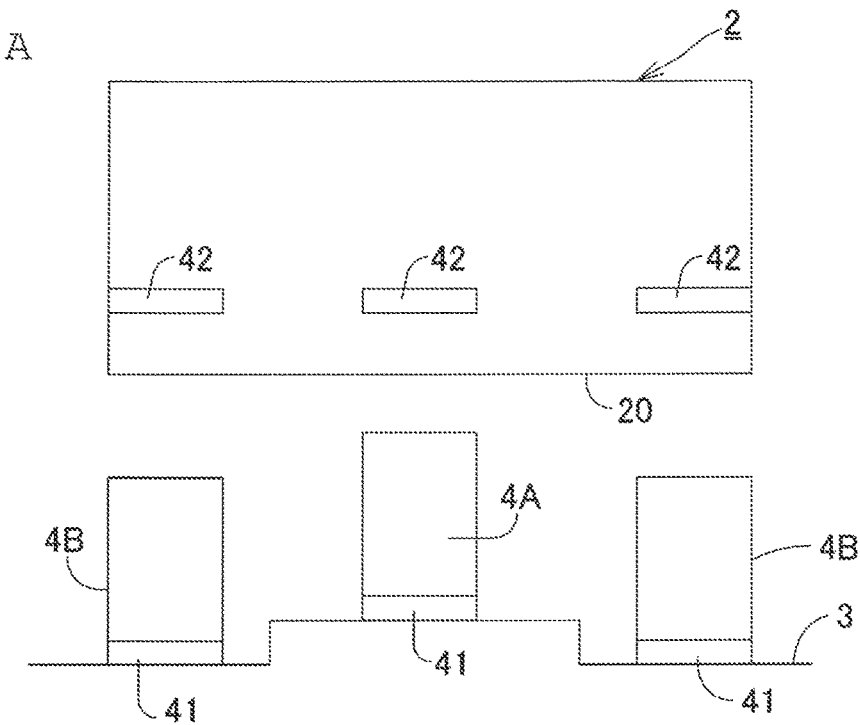
FIGS. 3A and 3B show a procedure for installing the engine unit support structure.
Figure 3:
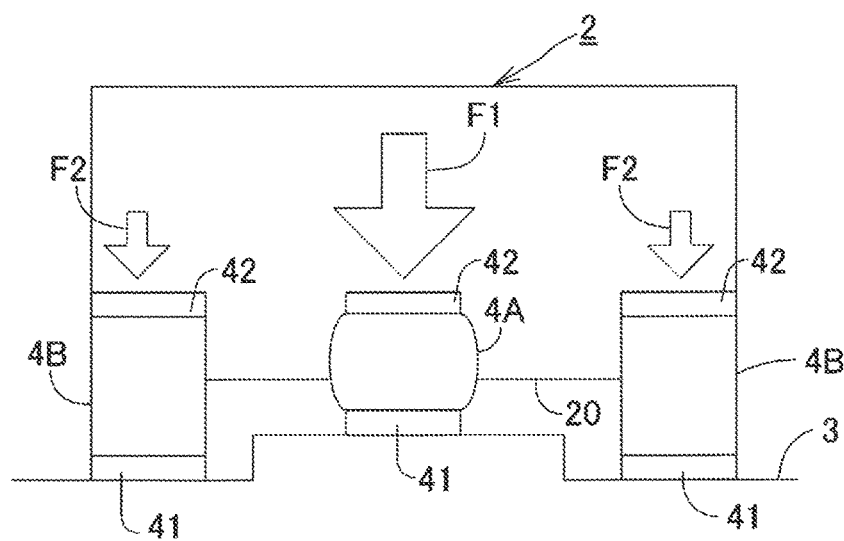

As shown in FIGS. 3A and 3B, the above-described two first elastic support bodies 4A and four second elastic support bodies 4B, 4B, . . . are used as the plurality of elastic support bodies 4, 4, . . . . The engine unit 2 is coupled to the first elastic support bodies 4A and the second elastic support bodies 4B from above the first elastic support bodies 4A and the second elastic support bodies 4B coupled to the mount 3. At this time, the first elastic support bodies 4A are placed higher than the second elastic support bodies 4B (see FIG. 3A), when the load of the engine unit 2 is not acting on the first elastic support bodies 4A and the second elastic support bodies 4B, so that the load of the engine unit 2 acts on the first elastic support bodies before the second elastic support bodies. Then the engine unit 2 and the first elastic support bodies 4A are coupled together, and the engine unit 2 and the second elastic support bodies 4B are coupled together. By doing so, the load of the engine unit 2 is borne by the first elastic support bodies 4A and the second elastic support bodies 4B in a distributed manner (see FIG. 3B). In this manner, each of the first elastic support bodies 4A bears more of the load of the engine unit 2. That is, as shown in FIG. 3B, a greater load F1 can be placed on the first elastic support bodies 4A than the load F2 placed on each of the second elastic support bodies 4B. Accordingly, it becomes possible to use rubber of a smaller spring constant as the second elastic support bodies 4B. This will improve the vibration absorption performance of the engine unit support structure 1. At the same time, the durability of the engine unit support structure 1 can be further improved because the load of the engine unit 2 is borne by the first elastic support bodies 4A and the four second elastic support bodies 4B, 4B, . . . .

Also, by adjusting the installation positions of the first elastic support bodies 4A, it becomes possible to equalize the distributed loads of the engine unit 2 to be borne by the four second elastic support bodies 4B, 4B, . . . . Thus, a stable engine unit support structure 1 excelling in both vibration absorption performance for pitching vibration and durability can be obtained easily.

Also, the first elastic support bodies 4A having the vertical (direction in which the engine unit 2 is supported) spring constant equal or equivalent to the second elastic support bodies 4B can produce the same effects as described above. In this case, the cost of the elastic support bodies 4 can be reduced because equal or equivalent first elastic support bodies 4A and second elastic support bodies 4B can be used.

It is to be noted that the first elastic support bodies 4A whose vertical (direction in which the engine unit 2 is supported) spring constant is different from the second elastic support bodies 4B can be used.

It is to be noted that the vibration absorption device as disclosed in Japanese Unexamined Patent Application Publication No. 2009-228770, for instance, may be used as the second elastic support bodies 4B.

That is, a pair of vibration absorption rubber structures equipped with bracket joints and bolt holes is sandwiched between a pair of plates. At the same time, one end of the bracket coupled to the bracket joint of the pair of vibration absorption rubber structures is coupled to the engine unit 2 as a vibration generator or to the mount 3 such as the vehicle frame as a vibration receiver. In this manner, a sandwich type vibration absorption device is used in which one of the pair of the plates is coupled to the mount 3 such as the vehicle frame as a vibration receiver or to the engine unit 2 as a vibration generator.

The pair of vibration absorption rubber structures is each includes a cylinder having a bolt hole formed by a cylindrical space, a vibration absorption rubber joined by curing bond or the like to the outer periphery of the cylinder to surround the cylinder, and an annular member attached to the other end surface of the vibration absorption rubber located on the other end side of the cylinder with the central axis of the cylinder as the center thereof. The annular member, which is coaxial with the central axis of the cylinder as the central axis thereof, has a cylindrical portion with larger diameter than the cylinder and a flange extending outward from one end of the cylindrical portion. And the flange surface on one side of the flange is coupled to the other end surface of the vibration absorption rubber by curing bond or the like.

The cylindrical portion of one vibration absorption rubber structure is inserted into the joint hole formed in the other end of the bracket from the other end side of the cylindrical portion of one vibration absorption rubber structure, and the cylindrical portion of the other vibration absorption rubber structure is also inserted from the other end side of the cylindrical portion of the other vibration absorption rubber structure. In this manner, the other ends of the respective cylinders of the pair of vibration absorption rubber structures and the other ends of the respective cylintrical portions are both placed opposite to each other, and the portion around the joint hole of the other end of the bracket is sandwiched between the other flange surfaces of the respective flanges of the pair of vibration absorption rubber structures. And one of the plates is placed on the end surface of the vibration absorption rubber located on one end side of the cylinder of one vibration absorption rubber structure. Also, the other of the plates is placed on the end surface of the vibration absorption rubber located on one end side of the cylinder of the other vibration absorption rubber structure. After this, bolts are inserted through the bolt hole in one of the plates, the bolt holes that are inner walls of each cylinder of the pair of vibration absorption rubber structures, and the bolt hole in the other of the plates, and nuts are attached to the threaded ends of the bolts protruding from the bolt holes in the other plate. Thus the vibration absorption device is formed.

Then one end of the bracket of the vibration absorption device is coupled to the engine unit 2, for instance. At the same time, the other plate of the vibration absorption device is coupled to the mount 3. By doing so, the vibration absorption device can be made to function as the second elastic support bodies 4B.

With the vibration absorption device as described above used as the second elastic support bodies 4B, the second elastic support bodies 4B play the role of a stopper when the vehicle body rebounds. This will prevent tensile force from being inputted to the first elastic support bodies 4A, thus producing an effect of improving the durability of the first elastic support bodies 4A.

The second elastic support bodies 4B may be of structures different from each other.

The elastic support bodies 4 may use spring instead of rubber.

Also, the joints 42 for the second elastic support bodies 4B on the engine unit 2 may be located higher than the joints 42 for the first elastic support bodies 4A.

The engine unit support structure 1 may be so arranged that more than one third elastic support bodies, instead of one of the pair of second elastic support bodies 4B, 4B or the other of the pair of second elastic support bodies 4B, 4B, are installed on the under surface 20 of the engine unit 2.

That is, the arrangement may be such that at least one pair of second elastic support bodies 4B is installed in a position farther from the pitching rotation central axis 22B of the engine unit 2 than the first elastic support bodies 4A and astride the above-mentioned virtual plane 22D.

A pair of first elastic support bodies 4A, 4A is preferably located such that the gravity center of each of the first elastic support bodies 4A, 4A is on the straight line orthogonal to the virtual plane 22D. However, it is not essential that the gravity center of each of the first elastic support bodies 4A, 4A is on this straight line.

Similarly, a pair of second elastic support bodies 4B, 4B is preferably located such that the gravity center of each of the second elastic support bodies 4B, 4B is on the straight line orthogonal to the virtual plane 22D. However, it is not essential that the gravity center of each of the second elastic support bodies 4B, 4B is on this straight line.

The present invention is applicable to engine unit support structures and methods for mounting engine units of agricultural machinery, ships, and vehicles equipped with three-cylinder engines. For example, it is applicable to support structures for engine units equipped with an engine and a transmission or engine units with an engine only and methods for mounting such engine units.

The engine unit support structure according to an embodiment of the present invention includes an engine unit having a three-cylinder engine, a mount for mounting the engine unit, and a plurality of elastic support bodies coupled to the engine unit and the mount, for supporting the engine unit. In the engine unit support structure, the plurality of elastic support bodies include a plurality of first elastic support bodies and a plurality of second elastic support bodies. And the second elastic support bodies are so disposed as to be orthogonal to a pitching rotation central axis of the engine unit and astride a virtual plane including a rolling rotation central axis of the engine unit, and the first elastic support bodies are disposed in positions closer to the pitching rotation central axis than the second elastic support bodies and astride the virtual plane. As a result, with the engine unit having a three-cylinder engine, distributed load to be borne by the second elastic support bodies can be reduced. Thus, an engine unit support structure excelling in vibration absorption performance for the pitching vibration can be provided.

Also, the distributed load of the engine unit to be borne by each of the first elastic support bodies is greater than the distributed load of the engine unit to be borne by each of the second elastic support bodies. This will reduce the distributed load of the engine unit to be borne by each of the second elastic support bodies. And it becomes possible to use rubber of a smaller spring constant as the second elastic support bodies. This will further improve the vibration absorption performance for the pitching vibration of the three-cylinder engine. At the same time, the durability of the engine unit support structure can be further improved because the load of the engine unit is borne by the first elastic support bodies and the second elastic support bodies. That is, an engine unit support structure excelling in both vibration absorption performance for the pitching vibration and durability can be obtained.

Also, the spring constants in the vertical direction of the first elastic support bodies and the second elastic support bodies are such that the vertical spring constant of the first elastic support bodies is greater than that of the second elastic support bodies. This makes it possible to arrange that the distributed load of the engine unit to be borne by the first elastic support body is greater than the distributed load of the engine unit to be borne by each of the second elastic support bodies. Hence, an engine unit support structure excelling in both vibration absorption performance for the pitching vibration and durability can be obtained.

Also, the first elastic support bodies are so disposed as to be orthogonal to the rolling rotation central axis of the engine unit and on a virtual plane including the pitching rotation central axis of the engine unit. As a result, the vibration absorption performance for the pitching vibration is further improved.

Also, a pair of first elastic support bodies so disposed as to be astride the virtual plane is arranged along the sides of the engine unit. As a result, it becomes possible to bring the pair of first elastic support bodies closer to the pitching rotation central axis of the engine unit, thus improving the vibration absorption performance for the pitching vibration.

Moreover, according to a method for mounting an engine unit to constitute an engine unit support structure as described above, first elastic support bodies and second elastic support bodies are provided in such positions that a load of the engine unit is borne first by the first elastic support bodies then by the second elastic support bodies when the engine unit is coupled to the first elastic support bodies and the second elastic support bodies coupled to a mount from above the first elastic support bodies and the second elastic support bodies, and then the engine unit and the first elastic support bodies are coupled together and the engine unit and the second elastic support bodies are coupled together such that the load of the engine unit is borne by the first elastic support bodies and the second elastic support bodied in a distributed manner. As a result, a stable engine unit support structure excelling in both vibration absorption performance for pitching vibration and durability can be obtained easily.

DESCRIPTION OF REFERENCE NUMERALS 1 engine unit support structure
2 engine unit
3 mount
4A first elastic support body
4B second elastic support body
22 engine
22A rolling rotation central axis
22B pitching rotation central axis
22D virtual plane
22E virtual plane
22S side of engine unit

The invention claimed is:

1. An engine unit support structure comprising:
   an engine unit having a three-cylinder engine;
   a mount for mounting the engine unit; and
   a plurality of elastic support bodies coupled to the engine unit and the mount to support the engine unit,
   wherein the plurality of elastic support bodies include a plurality of first elastic support bodies and a plurality of second elastic support bodies,
   wherein the second elastic support bodies are so disposed as to be orthogonal to a pitching rotation central axis of the engine unit and astride a virtual plane including a rolling rotation central axis of the engine unit, and the first elastic support bodies are disposed in a position closer to the pitching rotation central axis than the second elastic support bodies and astride the virtual plane, and
   wherein the first elastic support bodies are so disposed as to be orthogonal to the rolling rotation central axis of the engine unit and on a virtual plane including the pitching rotation central axis of the engine unit.

2. The engine unit support structure of claim 1, wherein a distributed load of the engine unit to be borne by each of the first elastic support bodies is greater than a distributed load of the engine unit to be borne by each of the second elastic support bodies.

3. The engine unit support structure of claim 1, wherein a spring constant in a vertical direction of each of the first elastic support bodies is greater than that of each of the second elastic support bodies.

4. The engine unit support structure of claim 1, wherein a pair of the first elastic support bodies is located along sides of the engine unit.

5. A method for mounting an engine unit to constitute an engine unit support structure, the engine unit support structure comprising:
   an engine unit having a three-cylinder engine;
   a mount for mounting the engine unit; and
   a plurality of elastic support bodies coupled to the engine unit and the mount to support the engine unit,
   wherein the plurality of elastic support bodies include a plurality of first elastic support bodies and a plurality of second elastic support bodies,
   wherein the second elastic support bodies are so disposed as to be orthogonal to a pitching rotation central axis of the engine unit and astride a virtual plane including a rolling rotation central axis of the engine unit, and the first elastic support bodies are disposed in a position closer to the pitching rotation central axis than the second elastic support bodies and astride the virtual plane, and
   wherein a distributed load of the engine unit to be borne by each of the first elastic support bodies is greater than a distributed load of the engine unit to be borne by each of the second elastic support bodies, said method comprising:
   providing the first elastic support bodies and the second elastic support bodies in such positions that a load of the engine unit is borne first by the first elastic support bodies then by the second elastic support bodies when coupling the engine unit to the first elastic support bodies and the second elastic support bodies coupled to a mount from above the first elastic support bodies and the second elastic support bodies; and then coupling the engine unit and the first elastic support bodies together and coupling the engine unit and the second elastic support bodies together such that the load of the engine unit is borne by the first elastic support bodies and the second elastic support bodied in a distributed manner.

\* \* \* \* \*